US Patent [19]
Allsing

[11] Patent Number: 4,956,102
[45] Date of Patent: Sep. 11, 1990

[54] METHOD FOR OPERATING ROTATING CYLINDRICAL FILTERS AND A ROTATABLE CYLINDRICAL FILTER

[76] Inventor: Karl J. Allsing, Nibblevägen 28, S-146 00 Tullinge, Sweden

[21] Appl. No.: 326,541
[22] PCT Filed: Sep. 8, 1987
[86] PCT No.: PCT/SE87/00403
§ 371 Date: Mar. 2, 1989
§ 102(e) Date: Mar. 2, 1989
[87] PCT Pub. No.: WO88/01899
PCT Pub. Date: Mar. 24, 1988

[30] Foreign Application Priority Data

Sep. 8, 1986 [SE] Sweden .................... 8603753

[51] Int. Cl.$^5$ .................. B01D 33/067; B01D 33/48
[52] U.S. Cl. .................... 210/784; 210/798; 210/402; 210/411; 210/510.1
[58] Field of Search ........... 210/636, 784, 798, 321.67, 210/321.68, 321.69, 321.87, 402, 404, 411, 510.1

[56] References Cited

U.S. PATENT DOCUMENTS

| | | | |
|---|---|---|---|
| 2,439,463 | 4/1948 | Gebauer | 210/402 X |
| 2,655,265 | 10/1953 | Little | 210/404 X |
| 2,673,748 | 3/1954 | Shaw | 210/402 X |
| 2,725,145 | 11/1955 | Mylius | 210/402 |
| 2,765,085 | 10/1956 | Strindlund | 210/402 X |
| 3,029,948 | 4/1962 | McKay | 210/402 X |
| 3,074,553 | 1/1963 | Szepan et al. | 210/402 X |
| 3,245,536 | 4/1966 | McKay | 210/402 X |
| 3,262,218 | 7/1966 | Cymbalisty | 210/404 X |
| 3,294,243 | 12/1966 | Cerlis | 210/402 |
| 3,419,144 | 12/1968 | Huntington | 210/78 |
| 3,567,030 | 3/1971 | Loeffler | 210/321 |
| 3,797,663 | 3/1974 | Bourdalé | 210/402 X |
| 3,883,434 | 5/1975 | Gayler | 210/321.68 X |
| 4,230,564 | 10/1980 | Keefer | 210/652 |
| 4,708,801 | 11/1987 | Galaj | 210/636 |
| 4,735,730 | 4/1988 | Bratten | 210/402 X |
| 4,822,488 | 4/1989 | Shatuck | 210/404 |

FOREIGN PATENT DOCUMENTS

| | | | |
|---|---|---|---|
| 550771 | 12/1957 | Canada | 210/402 |
| 36340 | 9/1980 | Japan | 210/321.69 |
| WO86/05998 | 10/1986 | PCT Int'l Appl. | |
| 1181689 | 9/1985 | U.S.S.R. | 210/411 |

OTHER PUBLICATIONS

Publication, Driftsinstruktion MAB; OM 592100 S 2/8010, Alfa-Laval AB, Sweden (1980), p. 9.
Publication, Driftsinstruktion FEUX; OM SO 4605 S 1/8204, Alfa-Laval AB, Sweden (1982), p. 1.3.

Primary Examiner—Robert Spitzer
Attorney, Agent, or Firm—Nies, Kurz, Bergert & Tamburro

[57] ABSTRACT

A method for application in conjunction primarily with so-called rotating filters of the kind which include a substantially cylindrical filter tube (1) which is provided with a permeable wall and which is sealingly journalled at preferably two axially spaced locations, preferably at the ends of the tube, and which is arranged for rotation about its longitudinal axis in a filter jacket (2), wherewith material to be filtered, the so-called feed, is supplied to a space or chamber (11) located between the filter jacket and the filter tube, and the filtered substance, the filtrate, being tapped-off from the interior of the filter tube.

The method is particularly characterized by sealing and journalling the filter tube (1) in a manner adapted to substantial changes in temperature in the filter tube and that facilities are provided for sterilizing the filter. When applicable, the bearings and seals can be sterilized and lubricated and cooled by means of sterilizing media, and, when applicable, the filter tube (1) is caused to rotate at relatively high speeds.

The invention also relates to a device for carrying out the method.

36 Claims, 4 Drawing Sheets

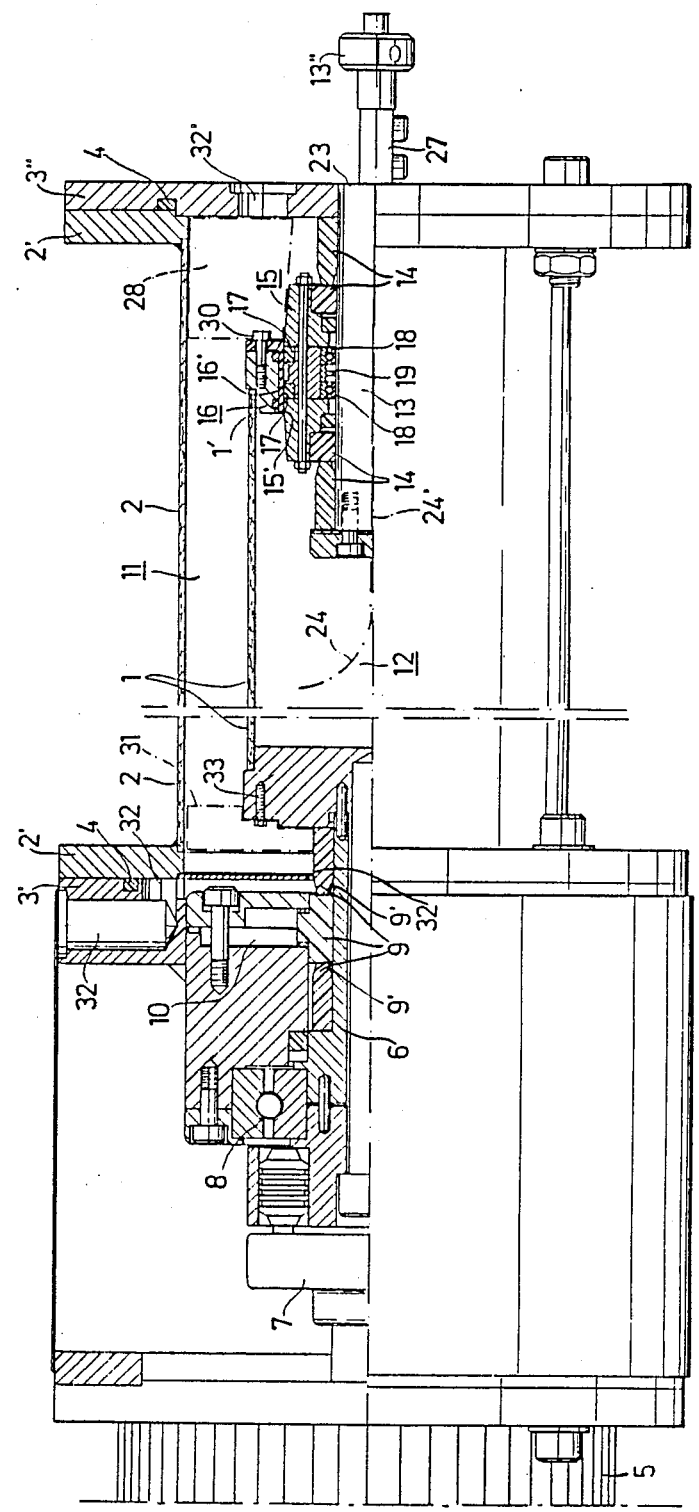

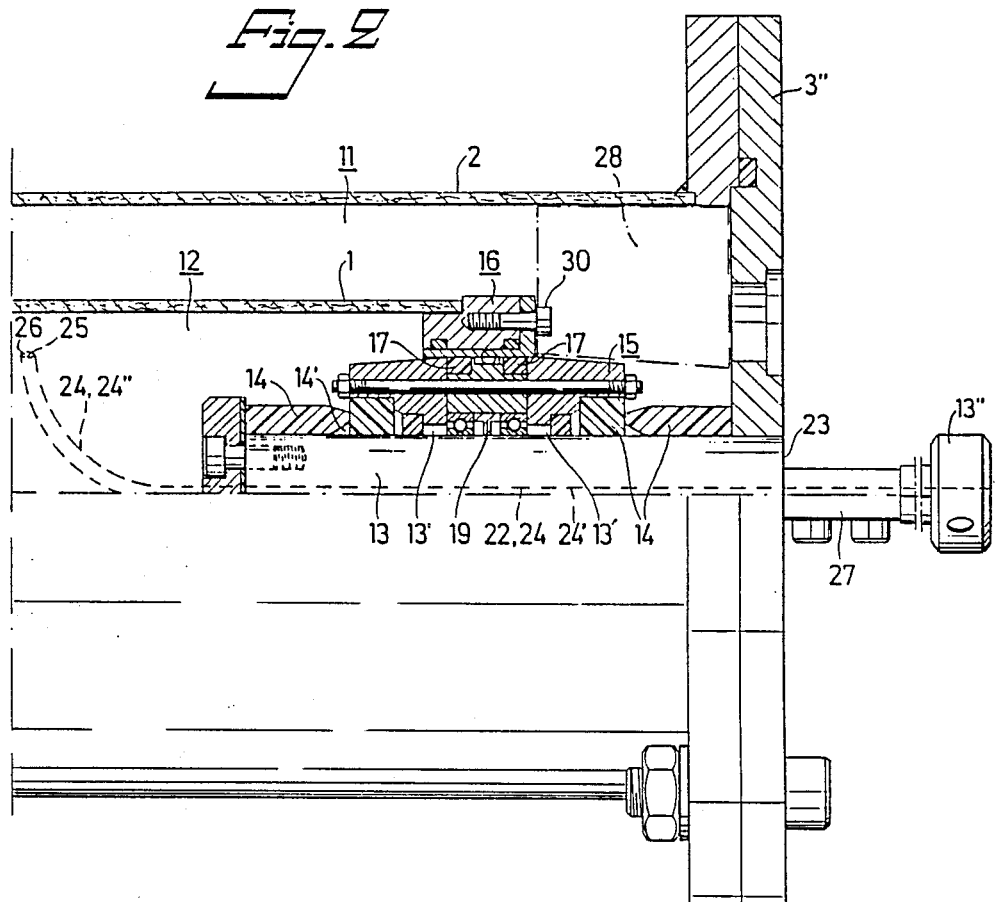
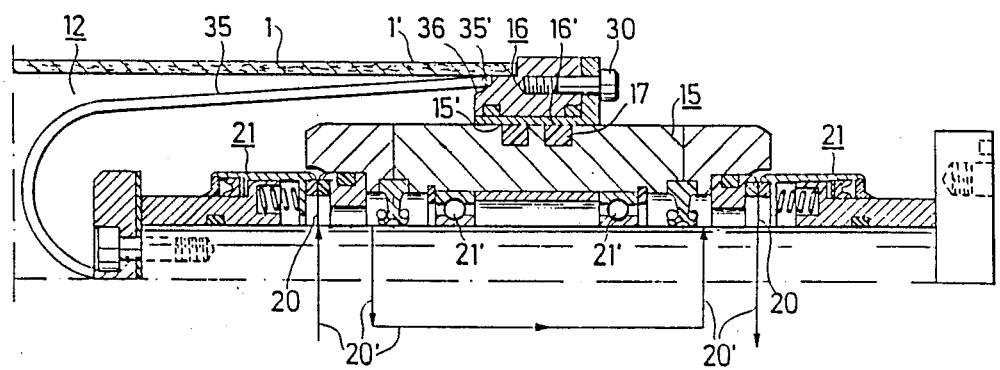

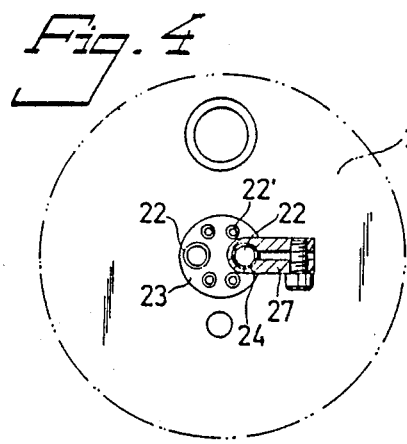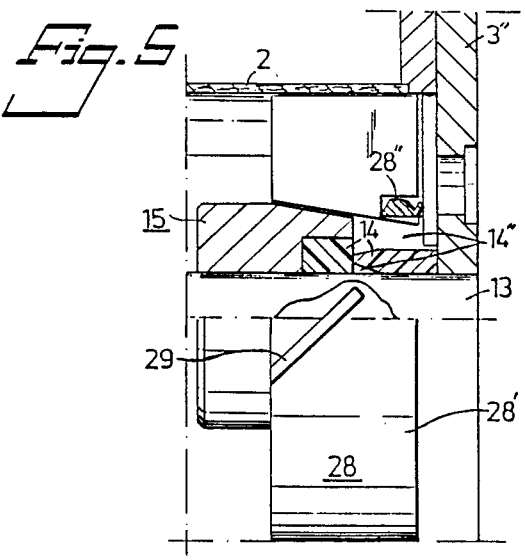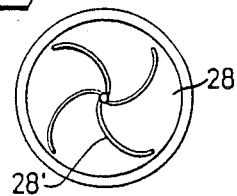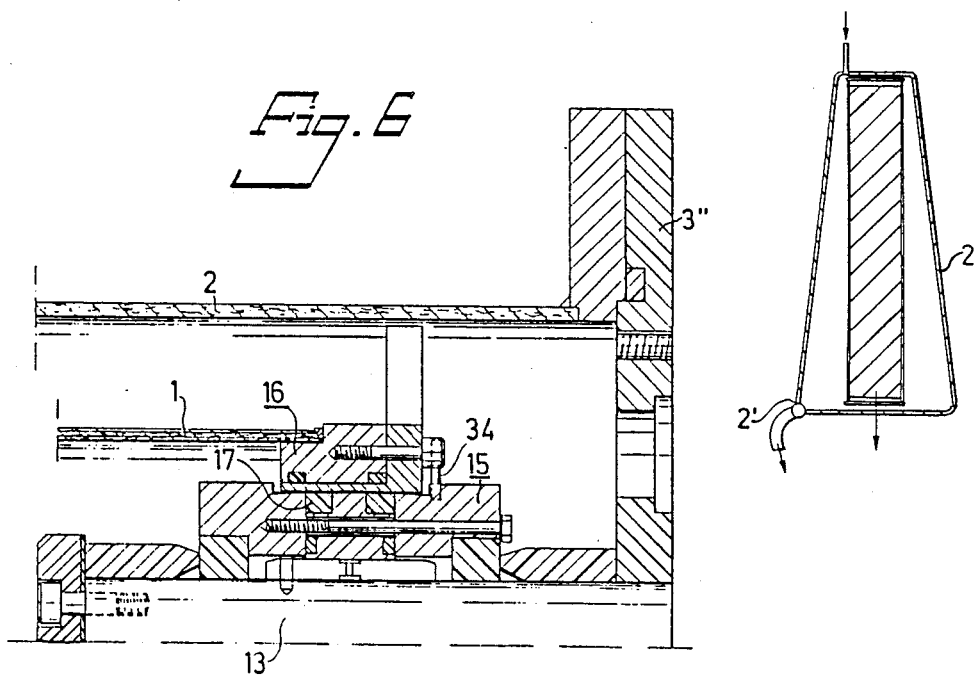

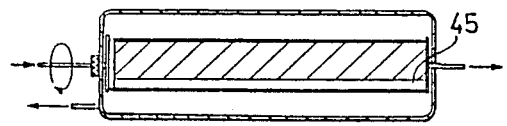
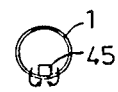
Fig. 8a　　　Fig. 8b
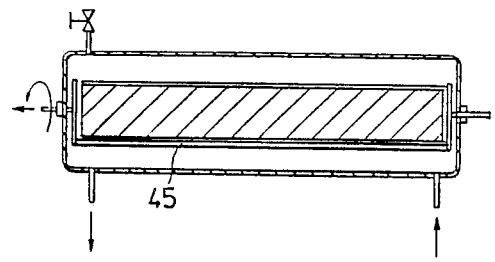
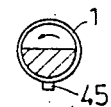
Fig. 9a　　　Fig. 9b
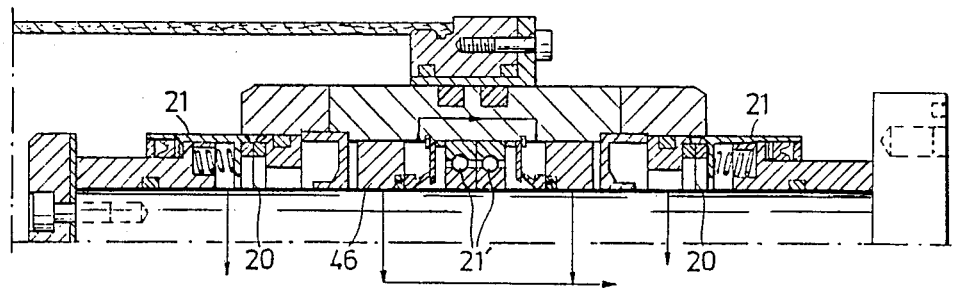
Fig. 10

METHOD FOR OPERATING ROTATING CYLINDRICAL FILTERS AND A ROTATABLE CYLINDRICAL FILTER

The present invention relates to a method in rotating filters of the kind which include a substantially cylindrical filter which has a permeable tube wall and which is journalled sealingly at preferably two axially spaced locations, preferably at the ends of the tube, for rotation about its longitudinal axis in a filter jacket, in which method material to be filtered, the feed, is fed to a space between the filter jacket and the filter tube, and in which the filtered material, hereinafter called the filtrate, can be removed from the interior of the filter tube.

The invention also relates primarily to a so-called rotating filter for carrying out the method.

Methods and filters of essentially the aforementioned kind are known to the art. The prior art techniques, however, are encumbered with such drawbacks as high costs, relatively limited capacities with regard, e.g.,to the dry solids contents that can be achieved therewith, and the relatively small possibility of maintaining flexibility with regard to conditions of use and maintenance and the fulfillment of high sterile requirements.

The present invention provides a method and filter which are not encumbered with such drawbacks. Thus, the cost of each unit of filtrate is low. Moreover, the invention enables beneficially high rotational speeds to be used. Flexibility with regard to use is also high. The method and filter according to the invention are particularly suited for use in biotechnical applications where demands on sterility are high. The word sterilization is used here as a common designation for processes which are intended to reduce or eliminate the risk of spreading infection. It will be understood that the invention also pertains to such processes as pasteurization and the like. The rotational motion is utilized, inter alia, to increase capacity and to improve journal and sealing functions.

Thus, the invention relates to a method for application in conjunction with primarily so-called rotating filters of the kind in which the filter includes a substantially cylindrical filter tube which has a permeable tube wall and which is sealingly journalled at preferably two mutually spaced axial locations, preferably at the tube ends, for rotation about its longitudinal axis in a filter jacket; in which material to be filtered, the feed, is fed to a space between the filter jacket and the filter tube; and in which filtered material, the filtrate, can be tapped from the interior of the filter tube.

The method is particularly characterized by sealing and journalling the filter tube in a manner adapted to substantial temperature changes of the filter tube and in a sterilizible or like manner; by sterilizing and lubricating and cooling bearings and seals when applicable with the aid of sterilizing media; and by rotating the filter tube, when applicable, preferably at a relatively high speed.

The invention also relates to a filter of primarily the socalled rotating kind which includes a substantially cylindrical filter tube which has a permeable tube wall and which is journalled at preferably two axially spaced locations, preferably at the ends of the tube, for rotation about its longitudinal axis in a filter jacket; and with which filter material to be filtered, so-called feed, is intended to be fed to a space between the filter jacket and the filter tube, and the filtered material, the filtrate, is intended to be tapped from the interior of the filter tube.

The filter is particularly characterized in that seals and bearings are arranged to take-up axial displacement movements and forces caused and created by substantial temperature changes in the filter tube; in that means are provided for sterilizing or similarly treating the filter tube; in that means are provided for sterilizing and for lubricating and cooling bearings and seals when applicable; and in that the filter tube is arranged for rotation at relatively high speeds.

The invention will now be described in more detail with reference to exemplifying embodiments thereof and to the accompanying drawings; in which FIG. 1 illustrates schematically and partially in axial section a first embodiment of a filter constructed in accordance with the invention;

FIG. 2 is an enlarged view of the right-hand part of FIG. 1;

FIG. 3 illustrates schematically a second embodiment of end journal means intended for the same purpose as in the FIG. 2 embodiment and seen as in FIG. 2;

FIG. 4 is a schematic illustration of the filter shown in FIG. 1, seen from the right in said Figure;

FIG. 5 illustrates schematically an embodiment of end journal means provided with a pump impeller, essentially in accordance, e.g., with FIG. 2 and seen as in FIG. 2;

FIG. 5a illustrates schematically a centrifugal pump impeller for us essentially in accordance with FIG. 5;

FIG. 6 illustrates schematically a third embodiment of end journal means seen as in FIG. 2;

FIG. 7 illustrates schematically and in axial section a filter which comprises a conical filter jacket;

FIG. 8a illustrates schematically and in axial section a filter having an internal suction box for back flushing, an end view being shown in FIG. 8b;

FIG. 9a illustrates schematically and in axial section a filter having a back flushing section box, an end view being illustrated in FIG. 9b; and FIG. 10 illustrates schematically a fourth embodiment of end journal means seen as in FIG. 2.

In FIG. 1 the reference 1 identifies a substantially cylindrical filter tube which is provided with a liquid permeable wall and which in the illustrated embodiment is sealingly journalled at two axially separated locations, in this case at the tube ends. The tube is journalled for rotation about its longitudinal axis in a filter jacket 2. In the illustrated embodiment, the filter jacket 2 is sealingly attached by means of flanges 2' at two end-cover parts 3', 3'', sealing rings 4 being provided peripherally between the flanges 2' and the end-cover parts 3', 3''. The one endcover part 3' forms an attachment for a drive means, e.g. an electric motor 5 by means of which the filter tube 1 is rotated via a journal and sealing unit. The filter tube of this embodiment is connected to a shaft 6 to which torque is transmitted via a resilient coupling 7 and which is journalled by means of ball bearings 8. The shaft 6 is passed sealingly through the end-cover 3', the seal of the illustrated embodiment being a double, mechanical plain seal 9: Located between the substantially large sealing surfaces of the double seal 9 is a space 10 to which a cooling and lubricating medium is supplied through channels not shown. The journalling and sealing unit is sterilized by means of heat, e.g. by means of steam, via, inter alia, the space 10.

The space 11 located between the filter tube 1 and the filter jacket 2 is intended to receive material to be filtered, socalled feed. Subsequent to passage through the wall 1 of the filter tube, the filtrate is tapped from the interior 12 of the tube. The space 11 can be placed under pressure to this end.

The other end-cover part 3″ carries attachment means for attachment of the end 1′ of the tube 1 remote from the drive motor. The tube 1 is sealingly journalled to a non-rotatable shaft 13, which is connected to the end-cover 3″ and journalled for movement in the direction of the longitudinal axis of the shaft while maintaining the shaft sealed. The embodiment illustrated in FIG. 1 is provided to this end with a journalling and sealing unit which comprises a double, mechanical plain seal 14 and includes a first part 15 which is sealingly journalled to the shaft 13 and includes an external, substantially cylindrical part 15′, and further includes a second part 16 which is sealingly connected to the filter tube 1 and, when seen in the direction of the tube radius, is arranged essentially between the filter tube and said first part and includes an internal, substantially cylindrical part 16′ which is sealed and axially displaceable in co-action with the external cylindrical part 15′ of the first part 15, the filter tube 1 at said end 1′ being sealingly fitted to said non-rotatable shaft 13. The reference 17 identifies sealing means intended for cooperation in said co-action. In the FIG. 1 embodiment the journal means comprises two ball bearings 18. The reference 19 in FIGS. 1 and 2 identifies an impeller or like device which is intended to rotate with the filter tube about said axial direction and is herewith arranged in an existing cooling and lubricating system for cooling and lubricating the bearings of the journalling and sealing unit, and is herewith arranged to circulate coolant and lubricant for, inter alia, temperature equalizing purposes. The impeller 19 may be constructed in a number of ways, for example, may have a T-shaped cross-sectional profile as illustrated in FIG. 1, including grooves in the flange-like part facing the shaft 13, said grooves forming a given angle to said longitudinal axis.

In the FIG. 3 embodiment, the said first part 15 of the journalling and sealing unit for the tube end 1′ is arranged between axially sprung sealing devices 21, via sealing surfaces 20. The two parts 15, 16 of this embodiment also include substantially cylindrical parts 15′, 16′.

According to one preferred embodiment, the aforesaid nonrotatable shaft is provided with at least one axially extending channel 22, FIG. 4, which connects the interior 12 of the filter tube 1 with the outer surroundings of the filter jacket. Thus, there is conveniently provided a channel 22 through which the filtrate can be tapped-off. Suitably a multiple of channels are provided, in FIG. 4 illustrated as outlet openings in a connecting piece 23 arranged adjacent the shaft 13, such as a further channel 22, e.g., for supplying flushing and washing liquid and/or gas such as an inert shielding gas, to the interior of the filter tube, and channels 22′, e.g., for measuring pressure, circulating coolant and lubricant for bearings, seals etc.

In accordance with preferred embodiments the filter tube 1 has provided therein scavenger pipes, scavenger plates or the like for removal of filtrate from the interior 12 of the filter tube as the filter rotates, said rotational movement in the correct direction being capable of generating feed pressure. An embodiment which incorporates a scavenger pipe or tube 24 is illustrated schematically in FIGS. 1, 2 and 4. When using scavenger plates, not shown, there is employed an impeller principle in which the impeller/plate is stationary and the liquid is imparted a rotational movement and is fed towards the centre of the impeller/plate. In the illustrated embodiment, in which the scavenger pipe 24 extends through the shaft 13, the discharge of filtrate can be adjusted by means of the pipe 24, which includes a part 24′ which extends substantially in the direction of the longitudinal pipe axis and a further part 24″ which is connected to said part 24′ and extends at least partially radially in the filter tube (1), said further part 24″ incorporating at its free end 25 a filtrate inlet 26 which faces substantially tangentially in the filter tube and in which said axially extending part 24′ is eccentrically located in the filter tube, so that the radial position in the filter tube of the filtrate inlet 26 adjacent said free end 25 can be adjusted by rotating the axially extending part about the longitudinal axis of said part, thereby displacing the inlet 26 in towards a plane extending essentially at right angles to said longitudinal axis, by pivoting the radially extending part 24″ about an eccentrically located longitudinal axis. A scavenger plate can be adjustably arranged in an essentially corresponding manner, by arranging for the diameter of the vane-plane of the plate or the like to be varied. The scavenger pipe of the illustrated embodiment is rotatable in the shaft 13 and protrudes therefrom and terminates in a knob or handle 13″ and can be locked against rotation by means of a clamping device 27 or the like. According to one preferred embodiment, an impeller 28 or the like, FIGS. 2 and 5, is arranged at the end of the filter tube 1 journalled for axial displacement, and is capable of being rotated about said longitudinal axis by means of the tube 1, the impeller or the like being intended to lower the pressure in central parts so as to relieve the pressure, either totally or partially, in the location of the seal 14 in the filter jacket. The impeller 28 is preferably a centrifuge-type impeller, although other kinds of impeller can be used of course. An impeller 28 is illustrated highly schematically in FIGS. 2 and 5. FIG. 5a is a view of an impeller seen in the direction of its long axis and provided with vanes 28′ or the like.

Preferably the aforesaid impeller 28 or like device is also provided with vanes 29 or the like for advancing material axially in the filter jacket, such as the discharge of sludge or slime. When the vanes 28′ and 29 are intended for similar feed functions the feed is effected subsequent to reversing the impeller, i.e. changing the direction of rotation. The reference 30 identifies fastener screws for an impeller 28, which are shown arranged in a part 16 by way of example.

Preferably, the filter jacket has arranged therein adjacent the inlet end of the tube 1 an impeller 31 or the like, referenced in FIG. 1, i.e. adjacent the existing inlet 32 for material to be filtered, this impeller 31 or the like being intended to increase the pressure at said inlet so as to improve the feed of said material into the filter jacket 2 (i.e. the flow of the unfiltered liquid both along the filter tube and in a direction tangentially thereto), and preferably for relieving, either totally or partially, the pressure prevailing in the vicinity of the journalling and sealing unit located adjacent said inlet in the filter jacket, in this case that part of the plain seal 9 located nearest the filter tube In this case, the impeller may, e.g., be of the centrifuge type, and may also be arranged for axial feed in a direction away from the inlet 32. The reference 33 identifies an attachment in the end-cover of the tube 1 for an impeller 31.

In the embodiment illustrated in FIG. 6 journalling is effected with the aid of slide bearings. The aforementioned parts 15 and 16 are arranged essentially in the manner described with reference to FIG. 1. The parts 15 and 16 of this embodiment are connected by means of a locking pin which prevents relative rotation between the locking parts 15 and 16. The locking pin 34 is constructed such that the tube 1 is journalled for axial movement in the aforedescribed manner. The plain seals illustrated symbolically in FIG. 6 can take-up a part of the aforesaid displacement movement. The construction of plain seals 20, 21 which are capable of taking-up such axial displacement is illustrated in FIG. 3.

The reference 35 in FIG. 3 identifies a scavenger pipe for complete scavenging of the filter tube, where the filter is intended to be used in a position in which its longitudinal axis extends substantially vertically, not shown in FIG. 3, there being arranged in the tube 1 a similar space 36 in the vicinity of the lower end of the tube, this space being the last region to be rendered dry when emptying the filter tube, where the inlet opening 35' of the scavenger pipe 35 is located in the bottom part of the space 36 in order to enable the filter tube to be scavenged to a substantially dry state, the inlet opening of the scavenger pipe preferably having a small dimension and suitably combined with a scavenger pipe of standard dimensions.

The space 11 may have arranged therein one or more baffles, not shown, for creating turbulence and vigorous agitation in said space. Each baffle forms a gap with the filter tube, this gap being narrower than the radial distance between the filter tube and the filter jacket. The use of baffles enables the turbulence in the space 11 to be increased, with subsequent increase in the capacity of the filter. A corresponding effect can be obtained by decreasing the distance between the filter tube 1 and the filter jacket 2. This will also reduce the volume of unfiltered liquid.

The filter jacket 2 of the filter embodiment illustrated in FIG. 7 has a conical configuration, and therewith widens outwardly towards the end 2' at which the sludge or slime outlet is located and from where said sludge or slime is removed. This filter jacket configuration facilitates sludge discharge.

The method according to the invention and also the manner in which the filter according to the invention operates will be apparent in all essentials from the foregoing. Thus, the material to be treated is fed through an inlet 32 to the space 11 located between the filter tube and the filter jacket, there being maintained in said space a pressure which deviates from the pressure prevailing in the filter tube. The filtrate entering the space 11 passes through the wall of the tube 1 under the influence of an overpressure relative to the pressure in the filter tube. A given variable through flow of material is maintained in the space 11, and a concentrate outlet 32' is preferably provided at the end of the filter opposite said inlet end. The filter tube is rotated at a suitable speed. The axially displaceable journal means enables a sealed journal to be maintained even when substantial changes in temperature etc. occur. The journal means, which can be sterilized, thus satisfy the high requirements placed on such seals and, when appropriate, the journals and seals are sterilized and lubricated and cooled by means of a sterilizing agent, such as steam.

So-called back flushing or back washing, i.e. the passage of, e.g., filtrate through the wall of the filter tube from the interior 12 of the tube 1 out to the space 11 between the tube 1 and the filter jacket 2, can be achieved through suitable facilities and is effected for the purpose of, inter alia, cleansing the active part of the filter and for removing unsuitable coatings, impurities, etc. liable to lower capacity, and, when appropriate, to cooperate in creating an effective filtering layer or cake on the filter tube 1, such a cake being referred to as a so-called dynamic membrane. Back flushing can be effected by changing the pressure in the filter unit so as to decrease the pressure differential available for filtering across the filter, i.e. primarily the pressure differential between the spaces 11 and 12, the pressure in the space or chamber 11 being greater than the pressure in the space or chamber 12. When this pressure differential is decreased sufficiently, filtered liquid is forced by centrifugal force back through the wall of the rotating filter tube and into the space 11. The back flushing thus effected flushes away particles and/or loosens particles which would otherwise tend to block the filter and therewith lower the filtering capacity. Back flushing can be achieved at a given, relatively low pressure difference, by increasing the rotational speed of the tube 1. Furthermore, as the filter tube 1 rotates, and also the liquid forced through the tube 1 by back flushing, together with the liquid located externally of the tube, those particles which are nominally heavier than the medium, which may be liquid and/or gas, surrounding the tube 1 are propelled outwards in a direction towards the cylindrical surface of the filter jacket 2. The pressure differential can also be reduced by decreasing the pressure on the incoming material to be filtered and/or on the outgoing unfiltered material, i.e. the concentrate, or by increasing the pressure and/or the quantity in the filter tube, i.e. the pressure in the space or chamber 12. This increase can be effected by supplying gas and/or liquid under suitable pressure through e.g., a flushing or washing pipe 22. Back flushing can also be effected by connecting the interior of the filter tube or the outer cylindrical surface thereof to a "suction box" 45. In the FIG. 8 embodiment the suction box is arranged against the inner cylindrical surface of the tube 1, and against the outer surface in the FIG. 9 embodiment. Back flushing is effected once with each turn of the tube wall in each case. When scavenging pipes, scavenging plates or like devices are used, the amount of liquid available for back flushing purposes can be varied, inter alia, by adjusting the rotational position of the tube or by adjusting the diameter of the scavenging plate and therewith the amount of liquid in the filter tube. It will be understood, however, that the amount of available liquid can also be varied in other ways, e.g. by creating back pressure, rotational changes, etc., and also through the amount of filtrate in scavenger pipes etc. and connecting systems.

The filter is preferably sterilized with the aid of pressurized steam, which is introduced through the inlet 32. Steam, sterile hot oil, or the like, is also passed through the seals 9, 14 etc., the spaces 9', 10 13', 14' etc., forming part of the cooling and lubricating system being used to this end. In this regard a given overpressure is maintained in the sealing system filled with sterile medium, in order to prevent the unintentional ingress of undesirable media. For the purpose of avoiding underpressure, sterile medium, such as air or water, must be supplied, particularly when cooling the filter unit.

FIG. 3 illustrates an embodiment in which cooling and lubricating liquid, such as water, is supplied to one side of the journal means, as indicated by the arrows 20, and removed at the other side in a system which, by flushing clean at an overpressure, holds the bearing means shielded from the filtrate and concentrate, thereby avoiding, e.g., taste impairments as a result of oil impurities in the filtrate. An arrangement essentially according to FIG. 3, in which the spaces are located, e.g., on both sides of the ball bearing 21', means and spaces can be arranged for, with the aid of a suitable medium, preferably when washing and/or sterilizing, heating the journal means for the purpose of de-watering lubricating grease. Means and spaces can also be provided for subjecting the bearing means to an underpressure for the purpose de-watering lubricating grease.

The filter is particularly constructed and suitable for forming and utilizing an additional filtering membrane in addition to the filter tube, with an external coating of filter fabric, filter net, or filter membrane of a kind suitable for the process concerned with regard to permeability (mesh size, pore size, etc.), sensivity to temperature and chemicals (sterilization etc.), etc. Dynamic membranes can be formed with the aid of filter auxiliaries which can be supplied in various ways, e.g. with sterilizing medium, filtrate or feed, and maybe of varying kind, such variables as particle size, particle form, density, etc. being of significance. Filter auxiliaries, which may also comprise a constituent of the material to be filtered, can be fractionated into suitable fractions and orientated, by utilizing the rotational movement and varying the speed and/or direction of said movement and/or varying the flow direction of the material to be filtered, i.e. the through flow of material and/or the aforesaid back flushing. Unsuitable fractions which are less suitable for subsequent filtration, can be removed, e.g., flushed away, upon completion of the fractioning process, by rotation, throughflow and/or back flushing. A suitable fraction or suitable fractions, protects, or protect, the filter cloth or membrane and facilitates (facilitate) cleaning while reducing contamination with less suitable particles and also decrease the apparent average pore size or average mesh size in the filter, so as to render subsequent filtration more effective i.e. to provide a better filtrate with smaller particles with regard to both number and size Examples of such less suitable particles are particles which tend to adhere, which are slimy or tacky and which therefore tend to block the filter cloth or the like and which may be difficult to remove when cleaning the filter.

As beforementioned, a multiple of different types of particles can be used. By using filter auxiliaries of elongated form, such as thread form, and by varying the flow directions and flow rates between the connection 32 and 32', the rotational speeds and rotational directions of the filter tube 1 etc., it is possible to weave a mat-like layer structure comprising various layers in which the layers have mutually different orientation. By utilizing available forces for activation by fractionation and orientation of such filter auxiliaries, it is also possible to "equalize" the filter fabric or the like, by blocking large holes or pores so as to obtain a smaller spread in hole size.

Those forces available are mainly forces which result from the flow through the filter, i.e. cross-flow from the feed inlet 32 to the concentrate outlet 32'.

forces created by rotation of the filter tube 1, i.e. cross-flow perpendicular to the cross-flow mentioned above forces deriving from a combination from the aforesaid flows caused by, e.g. the impeller 31 centrifugal force created by rotation forces created as a consequence of the density of the particle in relation to the liquid in which it is present, i.e. forces which impart to the particle the impulse to sink, hover or rise to the surface forces resulting from cross-flow when a particle fastens in the filter surface and accompanies the tube 1 essentially circumferentially of the tube.

It will be apparent from the aforegoing that the present invention provides a particularly flexible filtering process while fulfilling the extremely high demands placed in sterility.

Although the invention has been described with reference to embodiments thereof, it will be understood that other embodiments and minor modifications are conceivable within the scope of the inventive concept. For example, a conceivable embodiment is one in which, by selection, inter alia, of the direction of rotation, the filter cloth, membrane or the like can be firmly locked to the filter tube, applying overlapping ends in the circumferential direction.

Embodiments are also conceivable in which the pressure obtained by scavenging pipes, scavenging plates or the like is utilized for supplying medium, e.g. the filtrate, to the system used for cooling and lubricating a journalling and sealing unit and in which the pressure differential across the seals is measured, in certain instances adjusted accordingly.

Scavenging pipes or scavenging plates 46 can be arranged within the journalling or bearing unit according to FIGS. 2 and 3, for pumping out any liquid which might have collected, so as not to subject (ball) bearings to such unsuitable liquids. The scavenging pipe or scavenging plates are preferably placed in the space or chamber 13' or adjacent the ball bearings 21'. Discharge is effected via the stationary shaft 13. One embodiment is illustrated in FIG. 10.

As illustrated schematically in FIG. 5, it may be convenient in some instances to supply clean liquid when sealing in the space 14", this liquid being mixed with the concentrate by means of the impeller 28, via an additional seal 28" adjacent the end-cover 3". The clean liquid cleanses and protects the seal, and also facilitates discharge of the concentrate. Correspondingly, liquid can be admixed with the feed supplied to the inlet end. This mixture of liquid with the feed or the concentrate is facilitated by rotation of the filter tube and also by baffles, impellers, etc., when such devices are present.

Embodiments are also conceivable in which the power consumption is measured, there being obtained a measurement of the concentration achieved, this measurement being used to control the process and to adjust, e.g., the viscosity of the concentrate. One or more impellers can be used in this case, in order to amplify the measuring signal.

Suitable filter auxiliaries, particles, are often of a nature which will enable them to readily dissolve during a cleaning operation as a result of changes in temperature, pH or other parameters. Particles which will readily dissolve in a suitable washing liquor or which can be readily flushed away may also be chosen.

The permeable filter tube 1 can be arranged in a number of different ways. Thus, the tube may comprise a tubular body, which may be made of metal, a plastics material or some other material, and which has a perforated tube wall, or may comprise a tube manufactured from a sinter material, such as metal sinter, metal ceramics or the like. According to one preferred embodiment, the tubular body is made of sintered stainless steel. The embodiment in which the tubular body is made of sintered metal, metal ceramic or ceramic affords important advantages with regard to stability and robustness. Such a filter tube can be cleansed from particles deriving from, inter alia, feed, and withstands high temperatures, chemicals, such as acid, etc. The tubular body is preferably covered externally with at least one layer of filter net, filter fabric, filter membrane or filter paper. Several such layers may be placed on the tubular body. According to one embodiment the tubular body has provided thereon a filter support layer which forms a suitable support for a superimposed layer, which also functions as a draining material so that filtered liquid or backflushing liquid can flow laterally to suitable holes or suitable pores in the tubular body. One or more layers of filter fabric or the like can be placed on the drainage support layer. Said layer or layers can be coated externally with additional membranes such as dynamic membranes or precoats of filter auxiliary material or particles taken from the material to be filtered, or a combination of such particles, precoat and/or material for constructing a dynamic membrane, e.g. Zr- or Si-compounds or alcohols.

In the aforegoing there has been described an embodiment which comprises an elastic, direct coupling between motor and drive shaft 6 for the filter tube. Embodiments are conceivable, however, in which a magnetic coupling, not shown, is provided between drive motor shaft and filter tube or a shaft connected to the filter tube. One advantage afforded hereby is that motor shaft and filter tube or filter shaft can be arranged in spaces which are totally separated from one another. One important drawback, however, is that relatively long displacement between the shafts can only be accepted for short periods of time when the transferable torque decreases as respective magnetic parts move from their intended mutual positions.

A channel 22 may, as mentioned, be used for supplying gas, whereby the filtered liquid in the interior 12 of the tube may be varied both regarding pressure and quantity.

Changes regarding back pressure, as discussed earlier in connection to back flushing may be performed by means of changes at the filtrate outlet outside the filter or inside the filter tube 1 via channel 22.

Thus, the invention shall not be considered to be limited to the aforedescribed embodiments, since modifications can be made within the scope of the following claims.

I claim:

1. A method of operating rotating filters of the kind comprising a substantially cylindrical filter tube which is provided with a permeable wall and which is sealingly journalled at at least one locations, for rotation about its longitudinal axis in a filter jacket, in which method feed material to be filtered is supplied to a space located between the filter jacket and the filter tube, and in which filtered material, the filtrate, can be tapped from the interior of the filter tube, characterized by the step of sealing and journalling the filter tube (1) in a manner adapted to substantial temperature changes of the filter tube, seals and bearings being adapted to take up axial displacement movements and forces resulting essentially from changes in the temperature of the filter tube, by means of a journalling and sealing unit attached to the filter tube (1) and arranged adjacent at least one end (1') of the filter tube, said unit comprising two substantially cylindrical parts (15', 16'), one external (15') and one internal (16'), which are co-acting in a sealed and axially displaceable relationship.

2. A method of operating rotating filters as defined in claim 1, including the further step of sterilizing and lubricating and cooling the bearings and seals with aid of sterilizing media.

3. A method as defined in claim 1 wherein sealing and journalling the filter tube is undertaken at two axially spaced-apart filter tube locations.

4. A method according to claim 1, characterized by the further step of utilizing the rotational movement for discharging filtrate with the aid of a scavenging means (24,35), it being possible to adjust said discharge by said scavenging means.

5. A method according to claim 1, characterized by utilizing rotational movement of the filter tube for generating, by means of an impeller (19,28,31), pressure intended for feeding, pressure relieving, circulating, cross-flow and discharging of concentrate.

6. A method according to claim 5, characterized by generating pressure for at least partially relieving pressure on seals (9, 14, 20) located adjacent a bearing.

7. A method according to claim 5, characterized by generating pressure for the discharge of concentrate, and wherein the filter jacket (2) has a conical shape for facilitating said discharge, and said rotary movement being used also for feeding concentrate mechanically by means of discharge vanes both past the surface of the filter tube (1) and out of the filter unit.

8. A method according to claim 1, characterized by utilizing scavenger means (24) for varying the amount of filtrate in the filter a shaft, about which filter tube rotation takes place, being eccentrically located relative to a part of said scavenging means, the filter tube opening (20) being capable of taking different radial positions in the filter tube (1).

9. A method according to claim 1, characterized by utilizing scavenger means (24) for varying the amount of backflushing liquid available, a shaft, about which filter tube rotation takes place being eccentrically located relative to the scavenging means, the filter tube opening (20) being capable of taking different radial positions in the filter tube (1).

10. A method according to claim 1, characterized in that washing and cleansing are effected by backflushing, liquid being supplied from within the filter tube (1) in the filter through a scavenger pipe.

11. A method according to claim 1, characterized in that washing and cleansing are effected by backflushing liquid being supplied from within the filter tube (1) in the filter through a scavenger plate.

12. A method according to claim 1, characterized in that washing and cleansing are effected by backflushing, liquid being supplied from within the filter tube (1) in the filter through a separate flushing pipe.

13. A method according to claim 1, characterized in that washing and cleansing are effected by backflushing, liquid being supplied from within the filter tube (1) in the filter through the filter tube (1) because of rotation.

14. A method according to claim 1, characterized in that backflushing is effected by varying the pressure conditions.

15. A method as defined in claim 14, wherein the variation of pressure conditions is accomplished by varying the volume ratio.

16. A method as defined in claim 14, wherein the variation of pressure conditions is accomplished by variation of speed of filter tube rotation.

17. A method according to claim 1, characterized by utilizing rotational movement in combination with the flow from the inlet (32) to the outlet (32') of material to be filtered in the space between the filter tube and the filter jacket, the flow in the circumferential direction of the filter tube (1) resulting from said rotation, backflushing and particle density.

18. A filter of the rotating kind comprising a substantially cylindrical filter jacket, a substantially cylindrical filter tube which has a permeable wall and which is sealingly journalled by seals and bearings at least one axial locations, for rotation about its longitudinal axis in said filter jacket, the material to be filtered, the feed, being supplied to a first space located at one end of and between the filter jacket and the filter tube, and the filtered material, the filtrate, being tapped from the interior of the filter tube, and wherein the seals (9, 14, 20, 21) and bearings of the filter tube (1) are sterilizably arranged and constructed so as to take up axial displacement movements and forces resulting essentially from changes in the temperature of the filter tube (1), seals and bearings comprising means including a journalling and sealing unit attached to said filter tube (1) and arranged adjacent said one end (1') of said filter tube (1), said unit comprising two substantially cylindrical parts (15', 16'), one external (15') and one internal (16'), which are arranged to co-act in a sealed and axially displaceable relationship, and wherein said seals (9, 14, 20, 21) and bearings are constructed to enable said seals and bearings to be sterilized and lubricated and cooled by means of a sterilizing media.

19. A filter according to claim 18, characterized in that said filter includes a non-rotatable shaft, said filter tube is sealingly journalled at both tube ends on said shaft and said filter tube is journalled at one said end (1') for axial displacement on said non-rotatable shaft (13), while maintaining the sealing function.

20. A filter as defined in claim 19, wherein said filter jacket has an end-cover part (3") and said shaft is carried by said end-cover part.

21. A filter according to claim 19, characterized in that said journalling and sealing unit comprises a first part (15), which is sealingly journalled at said shaft (13) and includes said external, substantially cylindrical part (15') and further comprises a second part (16), which is connected to the first tube (1) and, when seen in the direction of the tube radius, is located essentially between the filter tube and said first cylindrical part (15), and wherein said external second part includes said internal, substantially cylindrical part (16'), said end of the filter tube being sealingly fitted to said non-rotatable shaft (13).

22. A filter according to claim 19, characterized in that said non-rotatable shaft (13) is provided with at least one axially extending channel (22), arranged to connect the interior (12) of the filter tube with the outside of the filter jacket (2).

23. A filter according to claim 19, characterized in that a pump impeller (28) is arranged at the filter tube end (1') journalled for relative axial displacement, and can be rotated about said shaft by the tube, and wherein the impeller is arranged to lower the pressure at several parts for the purpose of relieving pressure adjacent the journalling and sealing unit in the filter jacket (2).

24. A filter according to claim 23, characterized in that said impeller (28) is provided with vanes (29) for feeding material axially in said filter jacket (2).

25. A filter according to claim 19, characterized in that a pump impeller (31) is arranged in the filter jacket (2) adjacent an inlet (32) for the material to be filtered; and in that said impeller (31) is provided to increase the pressure at said inlet and to at least partially relieve the pressure in connection with said journalling and sealing unit in the filter jacket (2) adjacent said inlet.

26. A filter according to claim 18, characterized in that the journalling and sealing unit includes sealing parts which are mechanically displaceable in the axial direction and thereby are arranged to take up at least parts of said axial displacement.

27. A filter according to claim 18, characterized in that a scavenger means (24) is provided in the filter tube (1) for discharging filtrate from said tube, while utilizing the rotational movement of said tube; and wherein said scavenger means is effective in adjusting the discharge of filtrate.

28. A filter according to claim 27, characterized in that discharge by means of said scavenger means (24) is controllable by said scavenger means which includes a first part (24'), extending essentially parallel with the longitudinal axis of the filter tube (1), and a second part (24") which extends at least partially in the direction of the filter tube radius and which is connected to the first mentioned part (24'), and the free end (25) of said second part (24") includes a substantially tangential filtrate inlet (26) of said scavenger means, and wherein said scavenger means first part is located eccentrically in the filter tube so that the prevailing radial position of the filtrate inlet in the filter tube at said free end of said second part can be adjusted by pivoting the radially extending second part (24") about an eccentrically located axially extending plane.

29. A filter as defined in claim 28, wherein the prevailing radial position of the filtrate inlet in the filter tube at said free end of said second part is adjusted by pivoting the radially extending part (24") about the longitudinal axis of said first part.

30. A filter according to claim 27 characterized in that in addition to the filtrate tapping pipe (22), which connects the interior (12) of the filter tube with the outside of the filter jacket, there is provided a flushing pipe (22) through which a fluid material is supplied to the filter tube, and in that said connections between the filter tube and the outside of the filter jacket extend, via and include a fixed shaft (13) on which one end (1) of the filter tube is sealingly journalled.

31. A filter according to claim 27, characterized in that said scavenger means for discharging filtrate from the filter tube is adjustably arranged thereby enabling control of the amount of filtrate in the filter tube.

32. A filter according to claim 18, characterized in that a baffle device is provided to increase turbulence in the first space (11) located between said filter tube (1) and said filter jacket (2), said baffle device being mounted in the first space between the filter tube and the filter jacket to create said increased turbulence and making the radial distance between the filter tube and the filter jacket effectively smaller.

33. A filter according to claim 18, characterized in that a second space (36) is arranged in the filter tube at a location adjacent the other end of the filter tube, said filter tube being intended for use with its longitudinal axis extending essentially vertically so that said other end is the lower end, said second space (36) being the last space to be rendered dry when emptying the filter tube; in that scavenger means is a pipe (35) and the inlet opening (35) of the scavenger pipe (35) is located in the bottom part of said second space (36) in order to enable the filter tube to be brought to an essentially dry state; in that the inlet outlet opening of said scavenger pipe is of small dimensions; and in that the inlet opening of said scavenger pipe is connected to a pipe of larger dimensions.

34. A filter according to claim 18, characterized in that the filter jacket (2) has a substantially conical configuration and widens out towards the outlet end, so as to facilitate the discharge sludge.

35. A filter according to claim 18, characterized in that the body of said filter tube (1) is made from a sintered material.

36. A filter as defined in claim 35, wherein said filter tube is made from sintered stainless steel.

* * * * *

UNITED STATES PATENT AND TRADEMARK OFFICE
CERTIFICATE OF CORRECTION

PATENT NO. : 4,956,102
DATED : September 11, 1990
INVENTOR(S) : KARL J. ALLSING

It is certified that error appears in the above-identified patent and that said Letters Patent is hereby corrected as shown below:

Column 2, line 30, change "us" to --use--.

Column 10, line 33 (line 3 of claim 8), between "filter" and "a" insert a comma (,).

Column 11, line 14 (line 4 of claim 18), before "at" insert --at--.

Signed and Sealed this

Twenty-fifth Day of February, 1992

Attest:

HARRY F. MANBECK, JR.

*Attesting Officer*     *Commissioner of Patents and Trademarks*